(12) United States Patent
Lutowsky, Jr. et al.

(10) Patent No.: US 11,664,624 B2
(45) Date of Patent: May 30, 2023

(54) ELECTRICAL CONNECTORS WITH DISCONNECTION BLOCKING FEATURES

(71) Applicant: FORD GLOBAL TECHNOLOGIES, LLC, Dearborn, MI (US)

(72) Inventors: Steven Michael Lutowsky, Jr., Canton, MI (US); Fernando Salinas, Brighton, MI (US); Leann Marie Vernon, Dearborn, MI (US); Evan Mislick, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 17/119,227

(22) Filed: Dec. 11, 2020

(65) Prior Publication Data

US 2022/0190521 A1    Jun. 16, 2022

(51) Int. Cl.
*H01R 13/639* (2006.01)

(52) U.S. Cl.
CPC ....... *H01R 13/639* (2013.01); *H01R 2201/26* (2013.01)

(58) Field of Classification Search
CPC ................... H01R 13/639; H01R 2201/26
USPC .................................................. 439/371, 373
See application file for complete search history.

(56) References Cited

U.S. PATENT DOCUMENTS

| | | | | |
|---|---|---|---|---|
| 1,900,782 A * | 3/1933 | Way | ..................... | H01R 13/633 200/51 R |
| 2,511,906 A * | 6/1950 | Davis | ................... | H01R 13/639 D13/133 |
| 2,659,059 A * | 11/1953 | Johnson | ............. | H01R 13/6395 174/53 |
| 2,688,734 A * | 9/1954 | Welling | ............... | H01R 13/635 200/51 R |
| 3,059,073 A * | 10/1962 | French, Jr. | ............. | H01R 29/00 439/372 |
| 3,159,446 A * | 12/1964 | Protzmann | ......... | H01R 13/6395 174/67 |
| 3,270,267 A * | 8/1966 | Nolte, Jr. | .................. | B60L 1/04 200/51.09 |
| 3,428,936 A * | 2/1969 | Albert, Jr. | .......... | H01R 13/6395 174/67 |
| 3,811,104 A * | 5/1974 | Caldwell | ............ | H01R 13/6395 439/373 |
| 4,045,108 A * | 8/1977 | Olsen | ................. | H01R 13/6395 439/373 |
| 4,052,655 A * | 10/1977 | Vizza | ..................... | B60L 53/16 194/215 |
| 4,066,313 A * | 1/1978 | von dem Hagen | .. | H01R 13/639 439/471 |

(Continued)

FOREIGN PATENT DOCUMENTS

| | | |
|---|---|---|
| JP | 4832241 B2 | 12/2011 |
| JP | 2017059347 A | 3/2017 |
| KR | 101159725 B1 | 6/2012 |

*Primary Examiner* — Neil Abrams
(74) *Attorney, Agent, or Firm* — David B. Kelley; Carlson, Gaskey & Olds, P.C.

(57) ABSTRACT

This disclosure describes high voltage electrical connector assemblies for connecting components of electrified vehicles or components of any other type of power connection/power transfer system. Exemplary high voltage electrical connector assemblies include blocking devices adapted for blocking disconnection from a mating connector without first using a separate tool to remove the blocking device.

13 Claims, 4 Drawing Sheets

(56) References Cited

U.S. PATENT DOCUMENTS

| | | | | |
|---|---|---|---|---|
| 4,575,595 | A * | 3/1986 | Gill | H01H 9/20 200/50.3 |
| 4,752,236 | A * | 6/1988 | Carmichael | H01R 13/6395 439/372 |
| 4,851,725 | A * | 7/1989 | Keck | H02K 5/225 310/43 |
| 4,875,879 | A * | 10/1989 | Bunyea | A47L 9/26 439/457 |
| 5,174,293 | A * | 12/1992 | Hagiwara | H01R 25/00 439/304 |
| 5,338,211 | A * | 8/1994 | Kodama | H01R 13/639 439/367 |
| 5,872,410 | A * | 2/1999 | Sudoff | H02K 17/30 310/71 |
| 5,934,918 | A | 8/1999 | Wuechner | |
| 5,980,298 | A * | 11/1999 | Johnson | H01R 12/772 439/372 |
| 7,104,830 | B1 * | 9/2006 | Diaz | H01R 13/6395 439/372 |
| 7,410,377 | B2 * | 8/2008 | Wharton | H01R 13/633 439/353 |
| 8,029,308 | B2 * | 10/2011 | Saruwatari | H01R 13/6395 439/373 |
| 8,584,310 | B2 * | 11/2013 | Beers | A47L 9/2805 174/67 |
| 9,071,020 | B2 * | 6/2015 | Temmesfeld | B60L 53/16 |
| 9,093,788 | B2 * | 7/2015 | Lamb | B60D 1/64 |
| 9,827,950 | B2 * | 11/2017 | Lovett | E05B 81/56 |
| 9,873,329 | B2 * | 1/2018 | Ayala | H01R 11/281 |
| 2014/0009876 | A1 * | 1/2014 | Wang | H01R 13/6395 361/679.01 |
| 2014/0315412 | A1 | 10/2014 | Tripp | |
| 2014/0357112 | A1 * | 12/2014 | Ma | H01R 13/6392 439/347 |
| 2016/0031393 | A1 * | 2/2016 | Oga | H01R 11/01 174/72 A |

\* cited by examiner

ELECTRICAL CONNECTORS WITH DISCONNECTION BLOCKING FEATURES

TECHNICAL FIELD

This disclosure relates generally to electrical connectors, and more particularly to electrical connectors that include features for preventing disconnection from a mating connector unless a separate tool is used.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Many electrified vehicles include a multitude of high voltage electrical connectors for reliably connecting and transferring power between charging and powertrain components of the electrified vehicles.

SUMMARY

An electrical connector assembly according to an exemplary aspect of the present disclosure includes, among other things, a connector housing, a blocking device configured for blocking removal of the connector housing from a mating connector, and a fastener received through the blocking device and configured for securing the blocking device to either the connector housing or a surrounding structure.

In a further non-limiting embodiment of the foregoing electrical connector assembly, the blocking device includes a first clamshell arm and a second clamshell arm connected to the first clamshell arm by the fastener.

In a further non-limiting embodiment of either of the foregoing electrical connector assemblies, a second fastener connects the first clamshell arm and the second clamshell arm.

In a further non-limiting embodiment of any of the foregoing electrical connector assemblies, the first clamshell arm and the second clamshell arm engage one another at a hinged connection on an opposite side of the blocking device from the fastener.

In a further non-limiting embodiment of any of the foregoing electrical connector assemblies, the blocking device is a barrier plate mounted to the surrounding structure.

In a further non-limiting embodiment of any of the foregoing electrical connector assemblies, the barrier plate includes a first plate portion, a second plate portion, and a bridge portion that connects between the first and second plate portions.

In a further non-limiting embodiment of any of the foregoing electrical connector assemblies, the first plate portion includes an opening configured for receiving the fastener.

In a further non-limiting embodiment of any of the foregoing electrical connector assemblies, the second plate portion includes a pair of protruding prongs that are separated by a slot.

In a further non-limiting embodiment of any of the foregoing electrical connector assemblies, a cable bundle that is connected to the connector housing is accommodated within the slot.

In a further non-limiting embodiment of any of the foregoing electrical connector assemblies, the fastener is removable from the blocking device that prevents access to features of the connector housing that enable disconnection.

An electrified vehicle according to another exemplary aspect of the present disclosure includes, among other things, an electrified powertrain component including a mating connector, an electrical connector connectable to the mating connector, and a blocking device configured for blocking removal of the electrical connector from the mating connector. The blocking device includes either a clamshell design or a barrier plate design.

In a further non-limiting embodiment of the foregoing electrified vehicle, a fastener is received through the blocking device and configured for mounting the blocking device to either the electrical connector or a surrounding vehicle structure.

In a further non-limiting embodiment of either of the foregoing electrified vehicles, the electrified powertrain component is a traction battery pack, a power electronics module, or an electric machine.

In a further non-limiting embodiment of any of the foregoing electrified vehicles, the blocking device includes a first clamshell arm and a second clamshell arm connected to the first clamshell arm by at least one fastener.

In a further non-limiting embodiment of any of the foregoing electrified vehicles, the first clamshell arm and the second clamshell arm engage one another at a hinged connection on an opposite side of the blocking device from the fastener.

In a further non-limiting embodiment of any of the foregoing electrified vehicles, the blocking device is a barrier plate mounted to a surrounding vehicle structure.

In a further non-limiting embodiment of any of the foregoing electrified vehicles, the barrier plate includes a first plate portion, a second plate portion, and a bridge portion that connects between the first and second plate portions.

In a further non-limiting embodiment of any of the foregoing electrified vehicles, the first plate portion includes an opening configured for receiving a fastener.

In a further non-limiting embodiment of any of the foregoing electrified vehicles, the second plate portion includes a pair of protruding prongs that are separated by a slot.

In a further non-limiting embodiment of any of the foregoing electrified vehicles, a cable bundle that is connected to the electrical connector is accommodated within the slot.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes high voltage electrical connector assemblies for connecting components of electrified vehicles or components of any other type of power connection/power transfer system. Exemplary high voltage electrical connector assemblies include blocking devices adapted for blocking disconnection from a mating connector without first using a separate tool to remove the blocking device. These and other features of this disclosure are discussed in greater detail in the following paragraphs of this detailed description.

Figure 1:
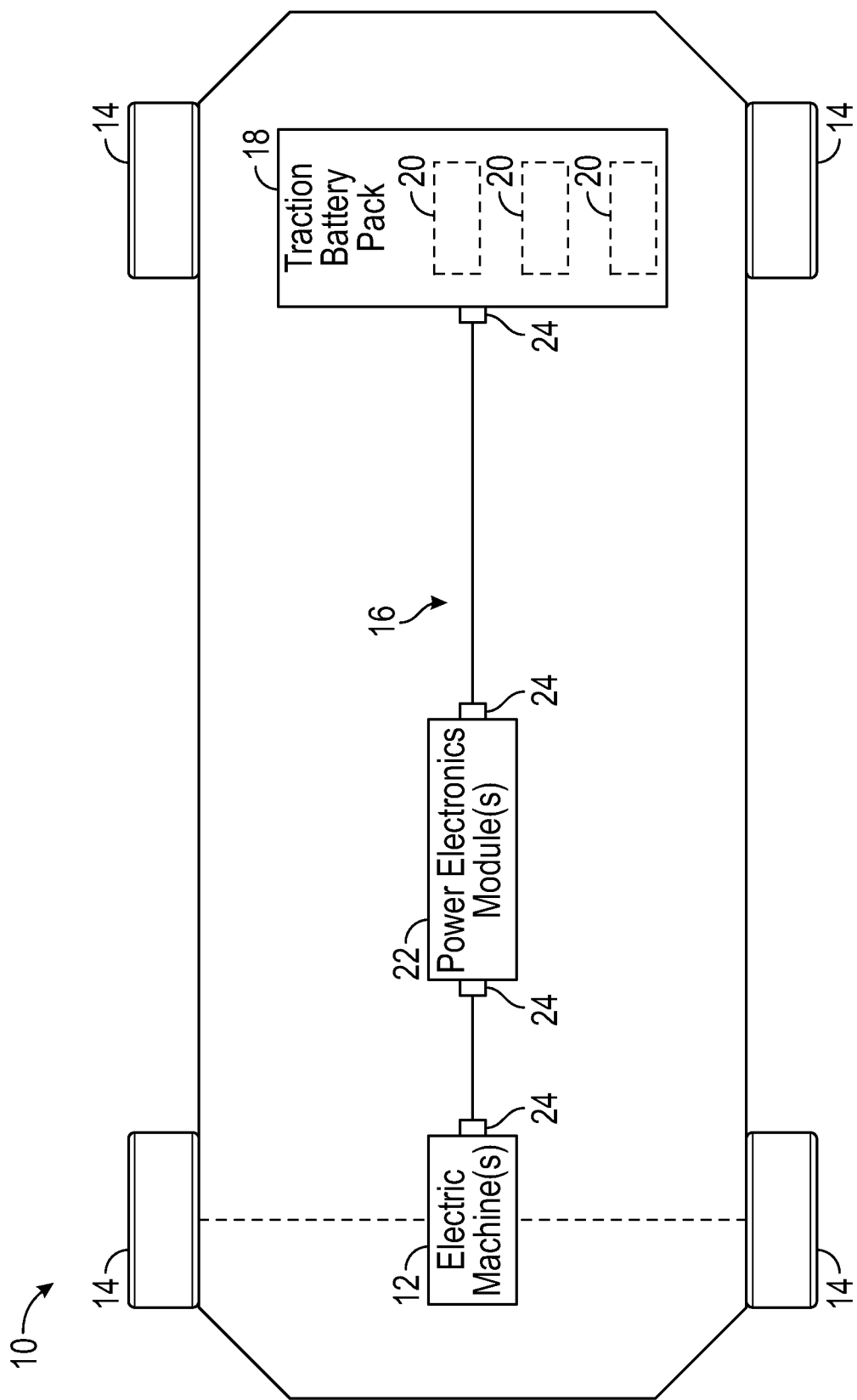
FIG. 1 schematically illustrates select portions of an electrified powertrain of an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). In another embodiment, the electrified vehicle 10 is a hybrid electric vehicle (HEV) or a plug-in hybrid electric vehicle (PHEV). Therefore, although not specifically shown in this embodiment, the electrified vehicle 10 could be equipped with an internal combustion engine that can be employed either alone or in combination with other energy sources to propel the electrified vehicle 10.

The teachings of this disclosure may be applicable to any type of vehicle, including but not limited to, cars, trucks, vans, sport utility vehicles (SUVs), etc. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component. Furthermore, as would be recognized by persons of ordinary skill in the art, the various concepts described herein are not limited to the field of electrified vehicles and could be applicable to any power connection/power transfer system.

The electrified vehicle 10 may be propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14 of the electrified vehicle 10.

A high voltage bus 16 electrically connects the electric machine 12 to a traction battery pack 18 through a power electronics module 22. The traction battery pack 18 is an exemplary electrified vehicle traction battery. The traction battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The power electronics module 22 may include a charger, a DC-DC converter, a motor controller (which may be referred to as an inverter system controller or ISC), etc. and is configured to bi-directionally transfer electrical energy between the traction battery pack 18 and the electric machine 12. For example, the traction battery pack 18 may provide a DC voltage output while the electric machine 12 may operate via a three-phase AC voltage. The power electronics module 22 may convert the DC voltage to a three-phase AC voltage as required by the electric machine 12. The power electronics module 22 may further convert the high voltage DC output of the traction battery pack 18 to a lower voltage DC supply that is compatible with vehicle auxiliary loads.

From time to time, charging the energy storage devices of the traction battery pack 18 may be required or desirable. Although not shown in the highly schematic depiction of FIG. 1, the electrified vehicle 10 could be equipped with various charging components (e.g., a charge port assembly, electric vehicle supply equipment, an on-board charger module (OBCM), etc.) for facilitating charging of the traction battery pack 18 from an external power source (e.g., a grid power source, etc.).

A multitude of high voltage electrical connector assemblies 24 may be utilized to connect the various components of the electrified powertrain of the electrified vehicle 10. The high voltage electrical connector assemblies 24, in combination with various cables and wiring harnesses, enable the connection and transfer of power between the charging and powertrain components of the electrified vehicle 10.

The high voltage electrical connector assemblies 24 represent high voltage source areas of the electrified vehicle 10. It may be desirable to limit vehicle occupant exposure to these areas. This disclosure thus describes high voltage electrical connector assemblies that include features for blocking access to disconnection features to prevent electrical connector disconnection without first using a separate tool.

Figure 2:
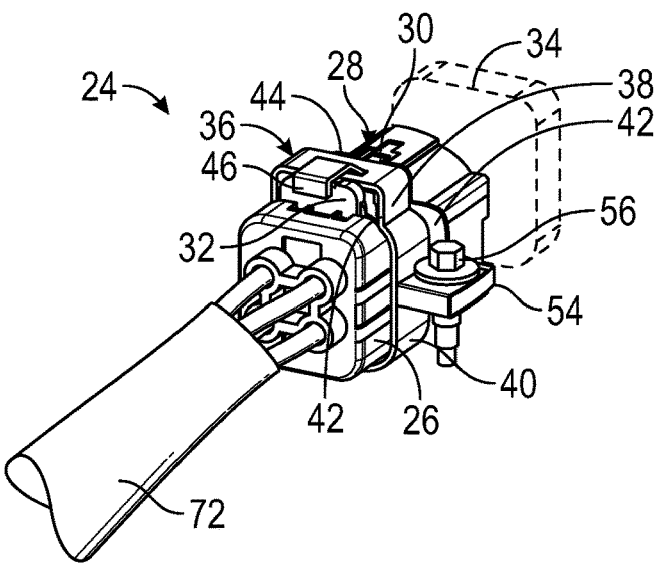
FIG. 2 is a perspective view of an exemplary high voltage electrical connector assembly.
Figure 3:
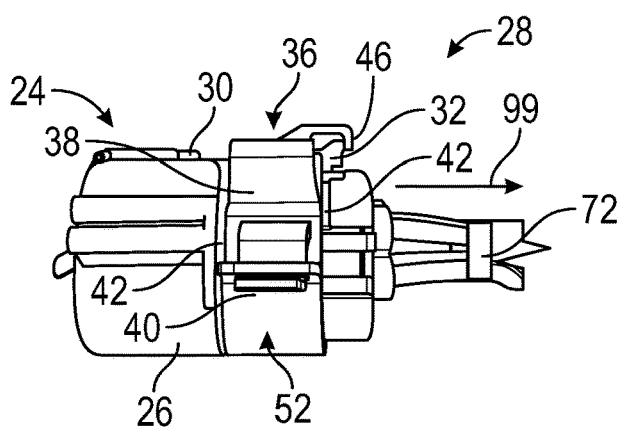
FIG. 3 is a side view of the high voltage electrical connector assembly of FIG. 2.
Figure 4:
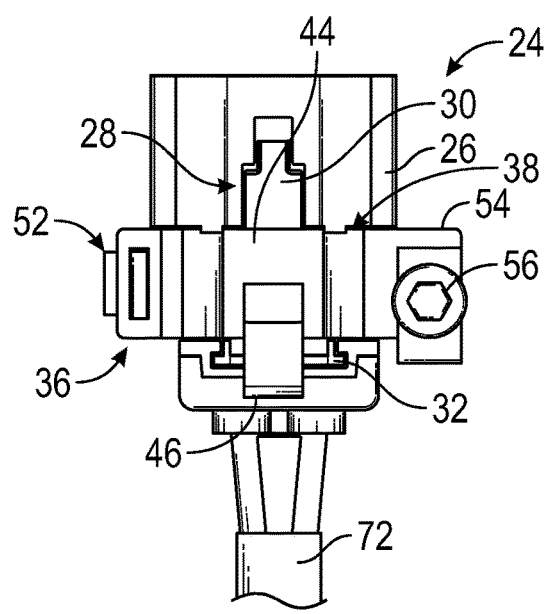
FIG. 4 is a top view of the high voltage electrical connector assembly of FIG. 2.
Figure 5A:
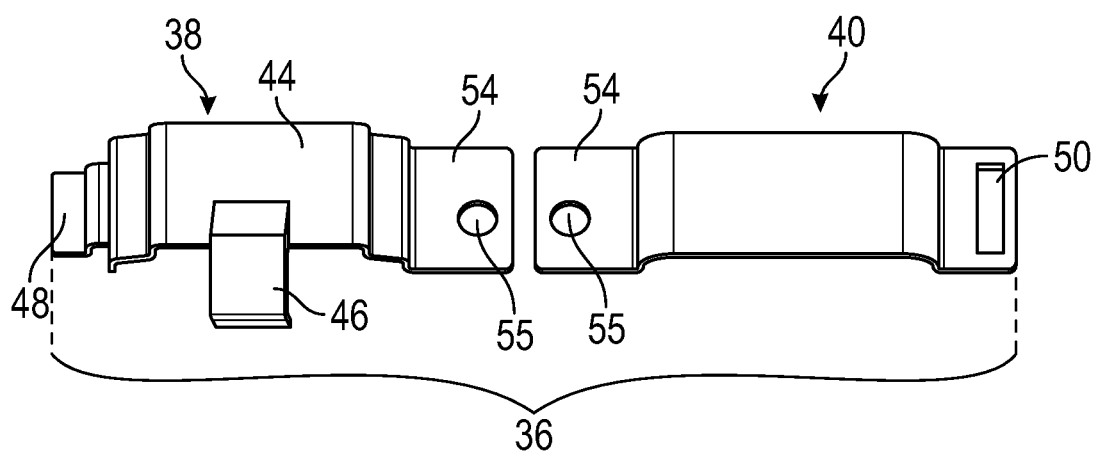
FIGS. 5A and 5B illustrate an exemplary blocking device of the high voltage electrical connector assembly of FIGS. 2-4.
Figure 5B:
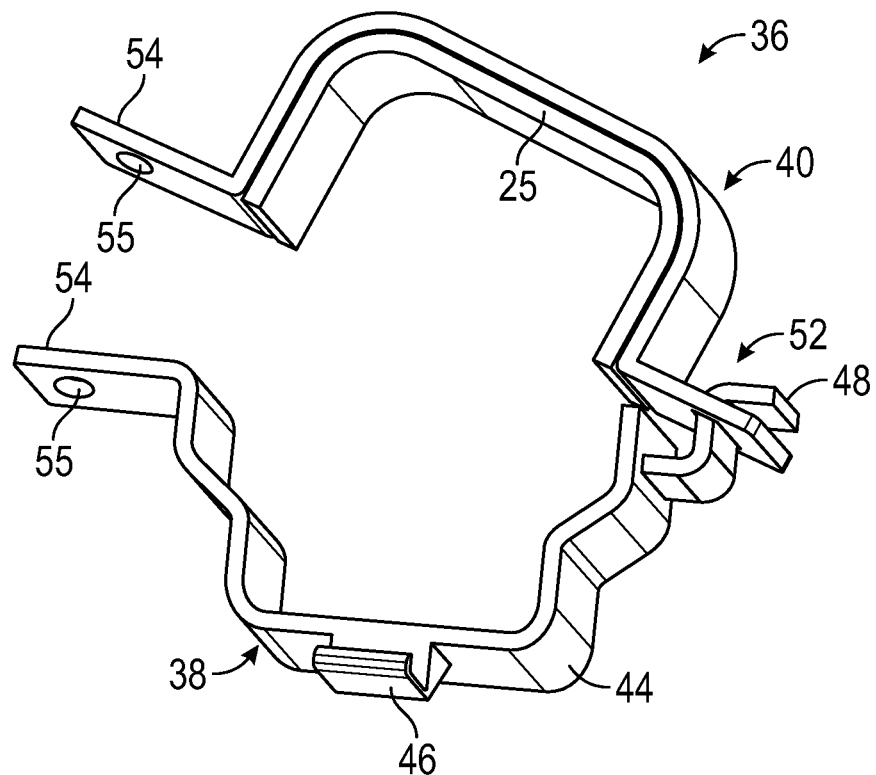

FIGS. 2, 3, and 4 illustrate an exemplary high voltage electrical connector assembly 24. The high voltage electrical connector assembly 24 may be employed for use within the electrified vehicle 10 of FIG. 1, or within any other power connection/power transfer system that involves the transfer of high current power. In other words, the high voltage electrical connector assemblies of this disclosure may have applicability outside of the field of electrified vehicles.

The high voltage electrical connector assembly 24 may include a connector housing 26 having a disconnection mechanism 28. The disconnection mechanism 28 is configured for separating the connector housing 26 from a mating connector 34 (see FIG. 2) of a component (e.g., an electrified powertrain component such as the traction battery pack 18, the power electronics module 22, the electric machine 12, etc.). A cable bundle 72 may be connected to the connector housing 26.

In an embodiment, the disconnection mechanism 28 includes a press lever 30 and a locking tab 32. The locking tab 32 may be displaced in a direction away from the press lever 30 (schematically shown with arrow 99 in FIG. 3) to enable a user to depress the press lever 30 for disengaging the connector housing 26 from the mating connector 34.

The high voltage electrical connector assembly 24 may additionally include a blocking device 36 adapted for substantially preventing the connector housing 26 from being disconnected from the mating connector 34 without the use of a separate tool. The blocking device 36 therefore prevents inadvertent exposure to high voltage sources of the electrified vehicle 10.

Referring now to FIGS. 2-4 and 5A-5B, the blocking device 36 may include a clamshell design that includes a first clamshell arm 38 and a second clamshell arm 40. The first and second claim shell arms 38, 40 may be arranged between locating walls 42 of the connector housing 26 and then secured together for blocking access to the disconnection mechanism 28 of the high voltage electrical connector assembly 24. For example, once secured in place, a main bridge 44 of the first clamshell arm 38 may extend over top of the press lever 30 of the disconnection mechanism 28, and a tab 46 that protrudes from the main bridge 44 may extend over top of the locking tab 32 of the disconnection mechanism 28.

The first clamshell arm 38 may include a hinge leg 48 received through an opening 50 formed through the second clamshell arm 40 for establishing a hinged connection 52 between the first and second clamshell arms 38, 40. Of course, an opposite configuration is also contemplated in which the first clamshell arm 38 includes the opening of the hinged connection 52 and the second clamshell arm 40 includes the hinge leg of the hinged connection 52.

The first and second clamshells arms 38, 40 may each include a mating flange 54 disposed on an opposite side of the blocking device 36 from the hinged connection 52. A fastener 56 (e.g., a bolt, screw, etc.) may inserted through an opening 55 formed through each of the mating flanges 54 for securing the first and second clamshell arms 38, 40 together. The fastener 56 must be removed from the blocking device 36 via a tool (e.g., a screwdriver) to gain access to the disconnection mechanism 28 for disconnecting the connector housing 26 from the mating connector 34. The blocking device 36 thus provides improved protection at high voltage sources within electrified vehicle powertrains or other power transfer systems.

In some embodiments, the connector housing 26 and the blocking device 36 are both polymeric structures. In other embodiments, the blocking device 36 is metallic structure. However, the size, shape, and material make-up of the connector housing 26 and the blocking device 36 are not intended to limit this disclosure.

In an embodiment, a noise, vibration, and harshness (NVH) material 25 is secured to one or both of the first and second clamshells arms 38, 40. The NVH material 25 may be foam, for example, although other materials may also be suitable. The NVH material 25 is configured and arranged to act as a cushion between the block device 36 and the connector housing 26 to prevent rattle.

Figure 6:
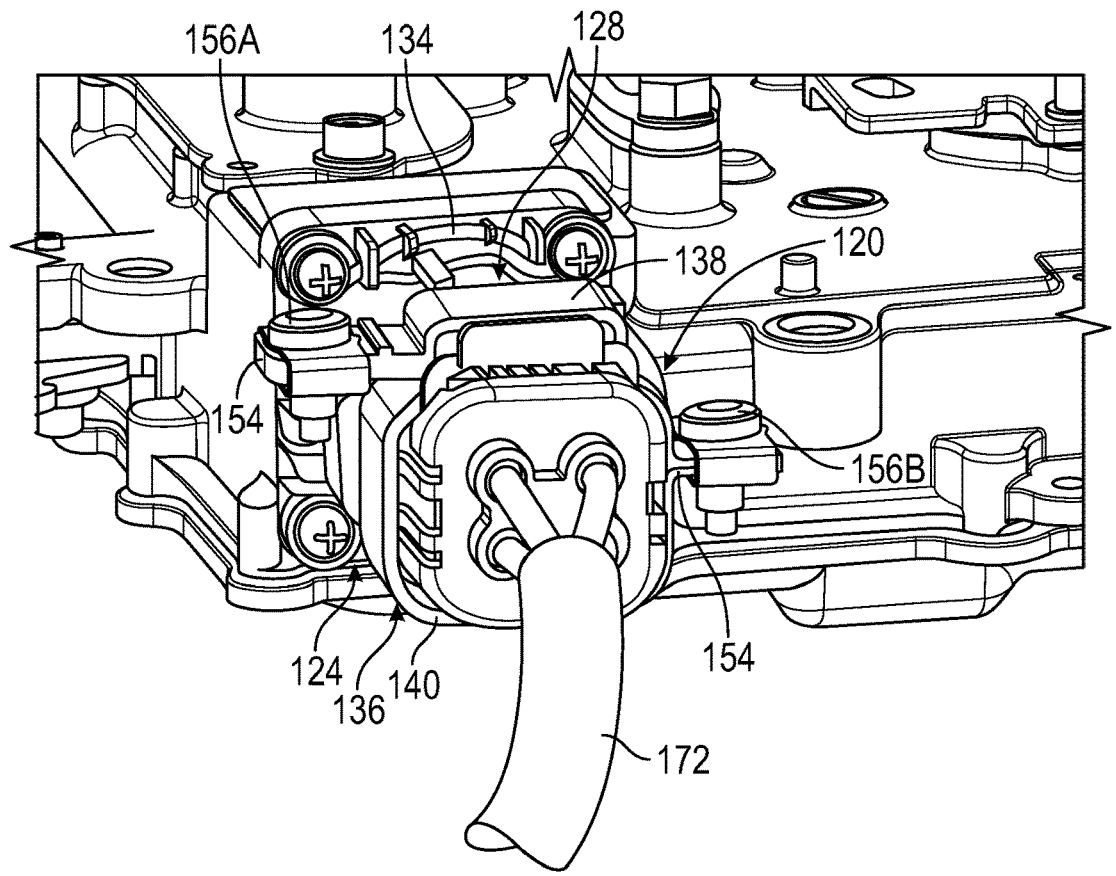
FIG. 6 illustrates another exemplary high voltage electrical connector assembly.

FIG. 6 illustrates a high voltage electrical connector assembly 124 according to another embodiment of this disclosure. The high voltage electrical connector assembly 124 may include a connector housing 126 having a disconnection mechanism 128, a wire bundle 172 connected to the connector housing 126, and a blocking device 136 adapted for substantially preventing the connector housing 126 from being disconnected from a mating connector 134 of a component without the use of a separate tool.

The blocking device 136 includes a similar clamshell design as the blocking device 36 discussed above. However, in this embodiment, first and second clamshell arms 138, 140 of the blocking device 136 may be secured together about the connector housing 126 by both a first fastener 156A and a second fastener 156B. The fasteners 156A, 156B may be disposed through mating flanges 154 of the first and second clamshell arms 138, 140 and may be positioned on opposing sides of the connector housing 126.

The fasteners 156A, 156B must first be removed from the blocking device 136 via a tool (e.g., a screwdriver) to gain access to the disconnection mechanism 128 for disconnecting the connector housing 126 from the mating connector 134. The blocking device 136 thus provides improved protection at high voltage sources.

Figure 7:
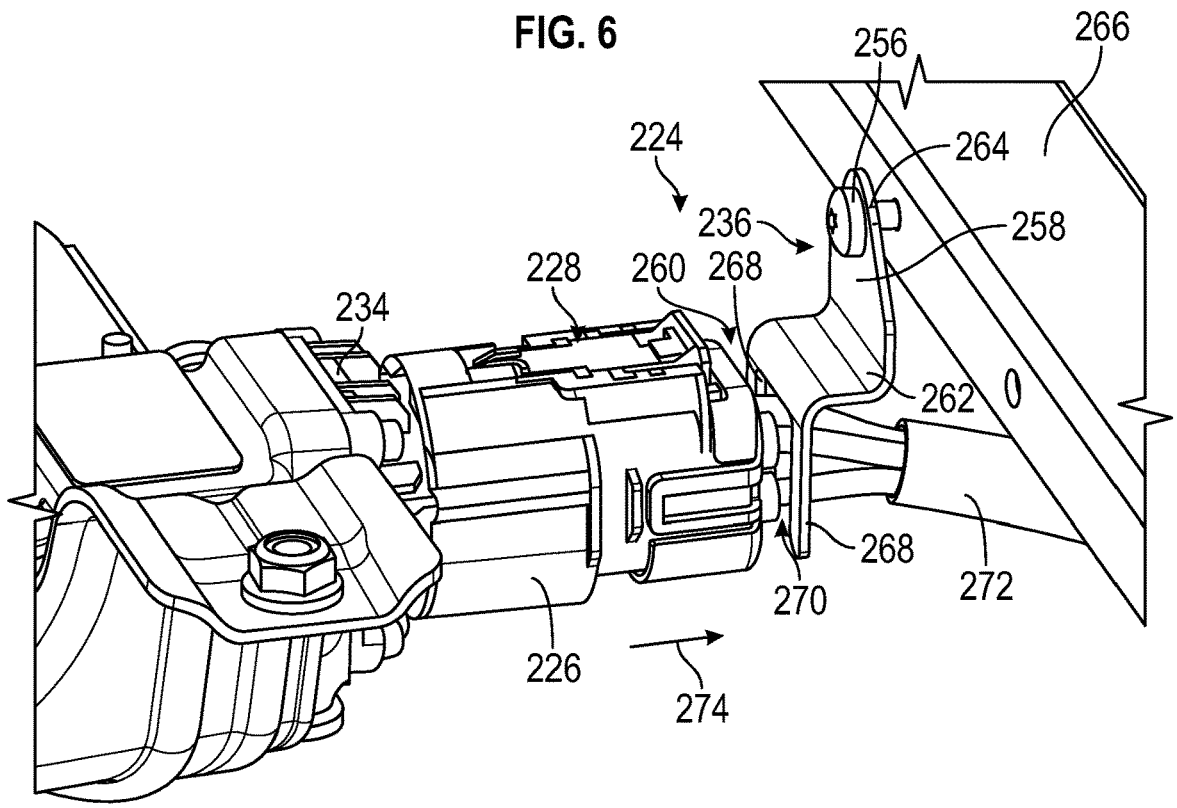
FIG. 7 illustrates yet another exemplary high voltage electrical connector assembly.

FIG. 7 illustrates a high voltage electrical connector assembly 224 according to yet another embodiment of this disclosure. The high voltage electrical connector assembly 224 may include a connector housing 226 having a disconnection mechanism 228 configured for separating the connector housing 226 from a mating connector 234 of a component. A cable bundle 272 may be connected to the connector housing 226.

The high voltage electrical connector assembly 224 may additionally include a blocking device 236 adapted for substantially preventing the connector housing 226 from being disconnected from the mating connector 234 without the use of a separate tool. In an embodiment, the blocking device 236 is configured as a barrier plate that includes a first plate portion 258 and a second plate portion 260. The first plate portion 258 and the second plate portion 260 may be connected by a bridge portion 262. In another embodiment, the blocking device 236 includes a stepped design in which the first and second plate portions 258, 260 extend in different planes.

The first plate portion 258 of the blocking device 236 may include an opening 264 for receiving a fastener 256. The blocking device 236 may be mounted to a surrounding structure 266 (e.g., a surrounding vehicle structure) that is nearby the connector housing 226 by inserting the fastener 256 through the opening 264 and then into the surrounding structure 266.

The second plate portion 260 of the blocking device 236 may include a pair of protruding prongs 268 that are separated by a slot 270. The cable bundle 272 may be accommodated within the slot 270 to simplify the routing of the cable bundle 272.

Once mounted to the surrounding structure 266, the blocking device 236, and in particular the protruding prongs 268, prevents or substantially limits sliding motion of the connector housing 226 in a direction schematically indicated by arrow 274 relative to the mating connector 234, thereby blocking the disconnection of the connector housing 226 unless the blocking device 236 is first removed from the surrounding structure 266 by removing the fastener 256 with a tool (e.g., a screwdriver). The blocking device 236 therefore acts as a barrier for preventing inadvertent exposure to a high voltage source.

The high voltage electrical connector assemblies of this disclosure include blocking devices that act as a physical barrier for blocking access to the features of the high voltage electrical connector that enable the connection to be disassembled. Service personal are required to use a tool to remove the barrier before disassembling the high voltage connection, thereby substantially preventing inadvertent exposure to high voltage sources.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrical connector assembly, comprising:
   a connector housing including a disconnection mechanism configured for separating the connector housing from a mating connector;
   a blocking device configured for blocking removal of the connector housing from the mating connector; and
   a fastener received through the blocking device and configured for securing the blocking device to either the connector housing or a surrounding structure,
   wherein the blocking device includes a first clamshell arm and a second clamshell arm connected to the first clamshell arm by the fastener,
   wherein the first clamshell arm and the second clamshell arm engage one another at a hinged connection on an opposite side of the blocking device from the fastener, and further wherein the hinged connection is established by a hinge leg of the first clamshell arm received through an opening of the second clamshell arm.

2. The electrical connector assembly as recited in claim 1, wherein the fastener is removable from the blocking device that prevents access to features of the connector housing that enable disconnection.

3. The electrical connector assembly as recited in claim 1, wherein the connector housing is a high voltage connector housing capable of transferring high current power.

4. The electrical connector assembly as recited in claim 1, comprising a foam material secured to at least one of the first clamshell arm or the second clamshell arm for providing a cushion between the blocking device and the connector housing.

5. An electrified vehicle, comprising:
   an electrified powertrain component including a mating connector,
   wherein the electrified powertrain component is a traction battery pack, a power electronics module, or an electric machine;
   an electrical connector connectable to the mating connector; and
   a blocking device configured for blocking removal of the electrical connector from the mating connector,
   wherein the blocking device includes either a clamshell design or a barrier plate design,
   wherein the blocking device includes a first clamshell arm and a second clamshell arm connected to the first clamshell arm by at least one fastener.

6. The electrified vehicle as recited in claim 5, comprising a fastener received through the blocking device and configured for mounting the blocking device to either the electrical connector or a surrounding vehicle structure.

7. The electrified vehicle as recited in claim 5, wherein the first clamshell arm and the second clamshell arm engage one another at a hinged connection on an opposite side of the blocking device from the fastener.

8. The electrified vehicle as recited in claim 5, wherein the blocking device is a barrier plate mounted to a surrounding vehicle structure.

9. The electrified vehicle as recited in claim 8, wherein the barrier plate includes a first plate portion, a second plate portion, and a bridge portion that connects between the first and second plate portions.

10. The electrified vehicle as recited in claim 9, wherein the first plate portion includes an opening configured for receiving a fastener, and further wherein the second plate portion includes a pair of protruding prongs that are separated by a slot, and further wherein a cable bundle that is connected to the electrical connector is accommodated within the slot.

11. The electrified vehicle as recited in claim 5, wherein a main bridge of the first clamshell arm extends over top of a press lever of a disconnection mechanism of the electrical connector.

12. The electrified vehicle as recited in claim 5, wherein a tab of the first clamshell arm extends over top of a locking tab of a disconnection mechanism of the electrical connector.

13. An electrical connector assembly, comprising;
   a connector housing including a disconnection mechanism configured for separating the connector housing from a mating connector;
   a blocking device configured for blocking removal of the connector housing from the mating connector; and
   a fastener received through the blocking device and configured for securing the blocking device to either the connector housing or a surrounding structure,
   wherein the blocking device includes a first clamshell arm and a second clamshell arm connected to the first clamshell arm by the fastener,
   wherein a main bridge of the first clamshell arm extends over top of a press lever of the disconnection mechanism, and a tab that protrudes from the main bridge extends over top of a locking tab of the disconnection mechanism.

* * * * *